United States Patent [19]
Greene

[11] Patent Number: 5,456,498
[45] Date of Patent: Oct. 10, 1995

[54] NEGOTIABLE INSTRUMENT FRAUD DETECTOR AND PROCESSOR

[75] Inventor: Edwin B. Greene, Greenbelt, Md.

[73] Assignee: BancImage, Inc., Paoli, Pa.

[21] Appl. No.: 169,207

[22] Filed: Dec. 20, 1993

[51] Int. Cl.⁶ .................................................. B42D 15/00
[52] U.S. Cl. ........................... 283/70; 283/92; 235/468
[58] Field of Search ................................ 283/58, 67, 70, 283/85, 92, 901, 74, 89; 235/468

[56] References Cited

U.S. PATENT DOCUMENTS

| | | | |
|---|---|---|---|
| 3,483,388 | 12/1969 | Ogle et al. | 235/468 |
| 4,114,804 | 9/1978 | Jones et al. | 235/468 |
| 4,151,667 | 5/1979 | Idelson et al. | 40/2.2 |
| 4,157,784 | 6/1979 | Grottrup et al. | 235/491 |
| 4,296,326 | 10/1981 | Haslop et al. | 250/372 |
| 4,442,170 | 4/1984 | Kaule et al. | 428/333 |
| 4,451,530 | 5/1984 | Kaule et al. | 428/323 |
| 4,501,439 | 2/1985 | Antes | 283/91 |
| 4,588,211 | 5/1986 | Greene | 283/70 |
| 4,627,642 | 12/1986 | Peronneau et al. | 283/92 |
| 4,634,148 | 1/1987 | Greene | 283/70 |
| 4,724,309 | 2/1988 | Greene | 235/468 |
| 4,863,783 | 9/1989 | Milton | 428/207 |
| 4,884,828 | 12/1989 | Burnham et al. | 283/89 |
| 5,044,668 | 9/1991 | Wright | 283/58 |

Primary Examiner—Richard K. Seidel
Assistant Examiner—Hwei-siu Payer
Attorney, Agent, or Firm—John J. Byrne

[57] ABSTRACT

A device for detecting fraudulent negotiable instruments by coating areas of the negotiable instruments with a fluorescent substance that, when subjected to an ultraviolet light source, develops an emission of a certain known frequency. The device includes a filter which only passes known emission frequencies so that negotiable instruments can be rejected that do not exhibit that frequency.

12 Claims, 1 Drawing Sheet

NEGOTIABLE INSTRUMENT FRAUD DETECTOR AND PROCESSOR

BACKGROUND OF THE INVENTION

With the advent of modern reproduction processes such as multicolored laser printers, many bank notes, airline tickets, and, most important, bank checks, can be duplicated in great detail at little expense. This has led to a substantial increase in bank fraud. With such reproduction equipment, one can scan a check and then image that check on the computer screen. There are programs available that will then permit the computer operator to selectively erase and/or change the amount to be paid or the name of the payee. The signature and all other characteristics of the check will remain the same. Modern printing apparatus will duplicate the original check (or other valuable document) in such detail that it will be processed by the clearing banks without detection. Even the maker may be confused as to authenticity when the check is returned because of the accurateness of his or her signature and the genuine appearance of the check.

Applicant's previous patents namely U.S. Pat. Nos. 4,588,211, issued May 13, 1986; 4,634,148, issued Jan. 6, 1987; and 4,724,309, issued Feb. 9, 1988, teach a method of selectively coating areas of negotiable instruments with a fluorescent material that can highlight material entered thereon wherein the data can be machine-read and duplicated in the production of a composite image statement. In general terms, the inventions described in these three prior patents have an area coated with a fluorescent or phosphorescent ink and, when an energy source, such as ultraviolet light, is applied to the coating during processing, a scanner is provided that reads the indicia which has been applied to said coating. This data is stored and processed. The teachings in these patents are incorporated in this disclosure by reference.

Also known to the prior art are various means of using coatings having luminescent or fluorescent properties that are used with ultraviolet or infrared sources for the detection of document forgery or falsification. One such prior art system is described in the Grottrup et al. U.S. Pat. No. 4,157,784, which uses protective coatings, inks and paper over a printing ink that have respective reflective or fluorescence properties that will be disturbed and detectable if one attempts to erase a document entry. Grottrup also utilizes additives within the paper itself which has fluorescent or luminescent properties. If someone attempts to erase and change the check, the coating will be disturbed and the exposed fluorescent material will be immediately detected under ultraviolet light. The Antes U.S. Pat. No. 4,501,439, dated Feb. 26, 1985, provides detectability of a fraudulent document by adding a substrate having two major surfaces with a transparent layer therebetween having a prearranged refraction index. The Haslop et al. U.S. Pat. No. 4,296,326, granted Oct. 20, 1981, shows a means by which ultraviolet radiation is used to discover the genuineness of water marks on paper. The Kaule et al. U.S. Pat. No. 4,451,530, issued May 29, 1984, uses a luminescent feature for determining authenticity of a document. In Kaule, luminophores are mixed with absorbing materials that change the excitation spectrum of the luminophores and means are provided to detect that change.

Thus, the prior art knows of processes wherein fluorescent ink is used in combination with ultraviolet light for purposes of processing negotiable instruments and the prior art is also aware of certain methods of using fluorescent, luminescent and luminophores for purposes of authentication. The invention described herein enables one to use the fluorescent or other particular coating applied for processing purposes to be used directly for authentication purposes.

SUMMARY OF THE INVENTION

The primary objective of this invention is to enhance the methods and techniques taught by my previous patents by incorporating anti-fraud instrumentation that can be used within accepted bank processing equipment without a substantial change to the documents to be authenticated or to the processing protocol.

A further objective of the invention is to provide a (fluorescent) coating for certain areas of a negotiable instrument which has a consistent and known emission spectrum when subjected to a particular energy source (such as ultraviolet light) which spectrum can be recognized and those negotiable instruments without this coating can be rejected.

Another objective of this invention is to provide a means along the processing path for processing negotiable instruments which utilizes the aforementioned emission spectrum to only accept documents having coatings with the aforementioned known emission spectrum.

Another important objective of the invention is to provide a detector means along the emission path of the fluorescent material which, after it is struck by an ultraviolet light source, emits an emission of known wavelength and then placing a notch filter in that path for screening emission frequencies that are not in accordance with authentic documents.

Other purposes, advantages and objectives of the invention will be better understood after reading the following description taken with the drawings.

DESCRIPTION OF THE PREFERRED EMBODIMENTS

Figure 1:
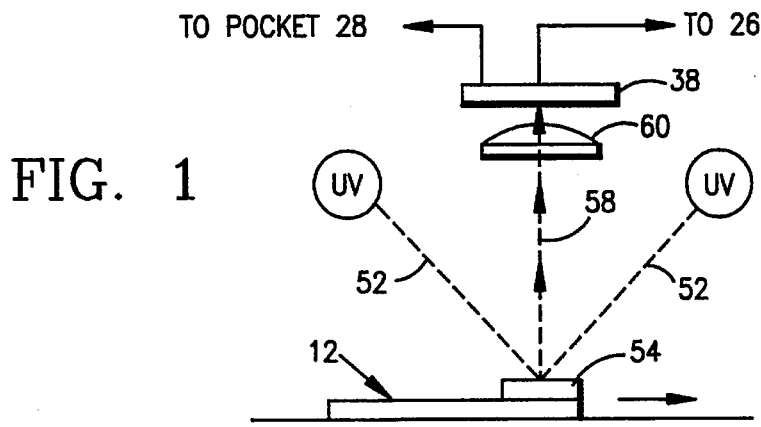
FIG. 1 is a diagrammatic view of the authentication apparatus.
Figure 2:
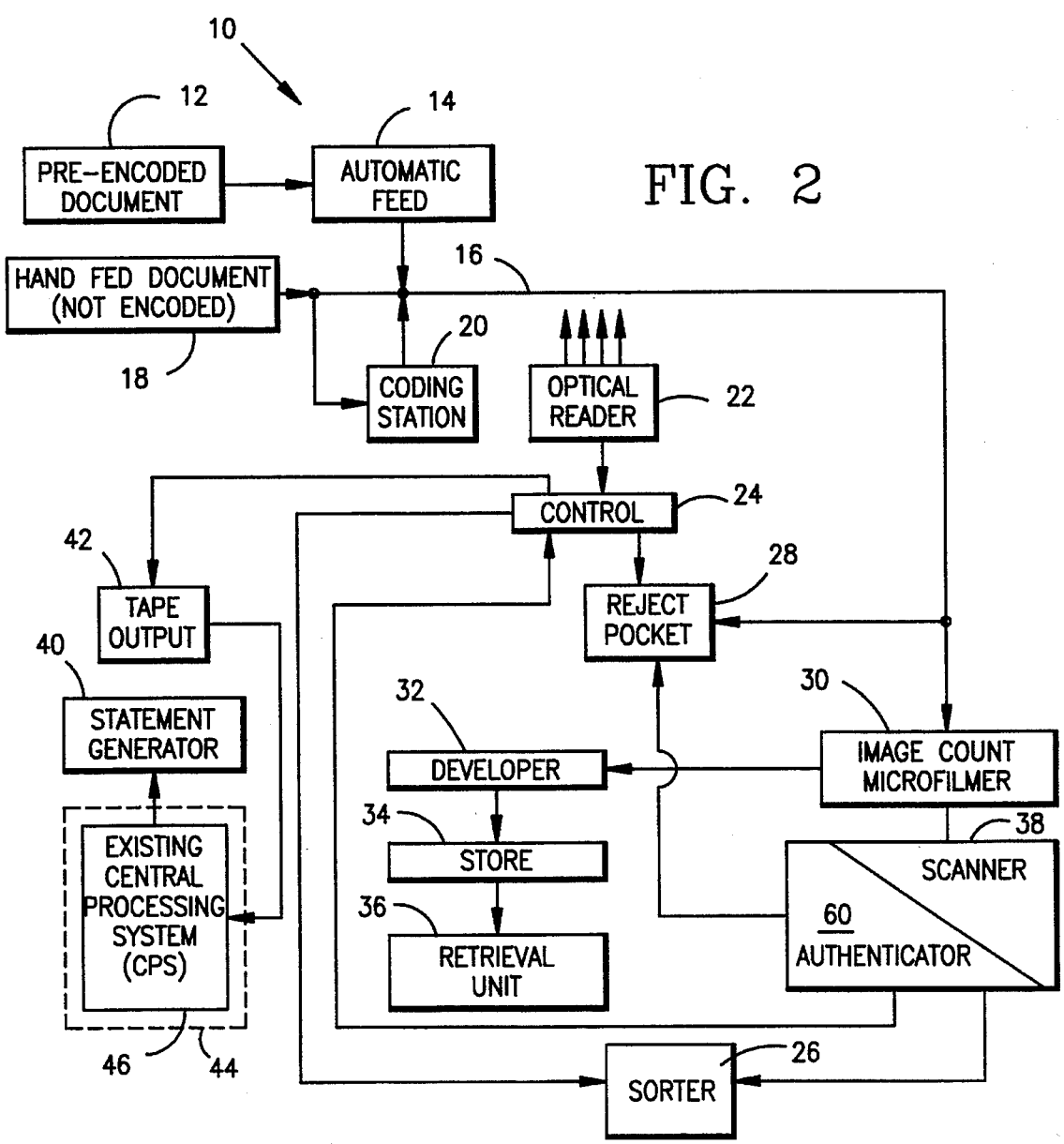
FIG. 2 is a block diagram of a document processing apparatus that has hand-entered data showing a document authentication within the processing flow.

Referring now to the drawings wherein like-numerals refer to like-parts, the numeral 10 refers generally to the processing and authenticating flow of this invention. The processing system 10 is adapted to receive documents or checks 12 on which at least one area is coated with a substance emitting a particular spectrum of frequency when subjected to a particular energy source. For instance, fluorescent inks of a certain make-up will emit at a certain frequency when some of the documents are pre-encoded and some are not. Pre-encoded documents 12 are placed in an automatic feed 14 where they are delivered into a document transport path 16. The pre-encoded documents include checks having the bank ID number, the account number, the check sequence number, and the amount pre-encoded along the bottom edge of the document. For example, many travelers checks and business checks are pre-encoded with the amount, but most consumer checks are encoded with the amount at the first receiving bank.

Documents 18 which have not been encoded are fed to a coding station 20. Such documents as personal checks on which the amount must be encoded at the bank after receipt, are encoded at coding station 20 and thereafter delivered to the document transport 16. The document transport path 16 carries the documents past a character recognition means 22. The character recognition means is preferably an optical reader designed to read a Farrington 7B font. Also, an optical MICR (Magnetic Ink Character Recognition) or a magnetic MICR read head can be employed.

The optical reader 22 scans the encoded characters on the document and produces visual recognition signals corresponding to each of the documents indicative of the encoded characters. These recognition signals are transmitted to a control 24. The control 24 is a digital computer. The control 24 sends a signal responsive to the recognition signals to a sorter 26. The sorter 26 contains a plurality of pockets in which documents may be stored according to pre-selected criteria. The control 24 also sends a signal to a reject pocket 28 if the recognition signals corresponding to a particular document indicate nonrecognition. Unrecognized checks are routed to pocket 28.

An authenticator notch filter 60, hereafter referred to in more detail, is also disposed along path 16. The authenticator is adapted to accept or reject the emission spectrum from the fluorescent coatings on the document. The authenticator 60 sends a signal to the reject pocket 28 if the coating does not have the correct emission characteristics. Devices associated with the path detect the presence or absence of a check and if the filter blocks the emission spectrum, the check is sent to the reject pocket.

Continuing along the document transport path 16, if the document is not sent to reject pocket 28 by the reader or the authenticator, it will next be processed by a copy means 30. The copy means 30 is preferably an image count microfilmer. The microfilmer 30 creates a permanent copy of the front and rear of all documents passing therethrough. The copies are then processed in a known fashion in a developer 32 and stored at 34. Whenever needed, these copies may be retrieved in a known manner by microfilm retriever 36. The documents are then transported past a scanning means 38, which is preferably a solid state, line scan camera.

The scanner 38 scans the document and develops digital information signals therefrom. These information signals are transmitted to the control 24. For example, on a check the scanner will scan the handwritten portion of the "Pay to the Order of" line, the signature line and the "Amount" area and, if desired, other zones of the check document as explained in the aforementioned Greene patents. The documents are then transported to the sorter 26 where they are stored in preselected pockets. The control 24 stores the information contained in the recognition signals from the optical reader 22 and the information signals received from the scanner 38 on an output medium. The output medium may be magnetic tape 42, a cassette or a disc. This output record is delivered to the existing central processing system 46 (CPS). The image data obtained via the information signals from the scanner 38 and the recognition date obtained via the recognitions signals from the optical reader 22, relative to the ON-US checks only, are cycle-sorted onto the storage media. At cycle time, the accumulated files are reentered to a random access device and are sorted by account number sequence and by check sequence number within accounts. The structured files are then merged with a master file and a history file to generate a statement file. The entire function takes place within the CPS, which is denoted as already existing within the user system by dotted lines 44. The statement generator 40 receives an output from the CPS 44 to create both a microfilm image and a hard copy statement of the account. The statement generator 40 can be one of a number of known prior art devices classified as computer output microfilmers, film-to-paper devices or laser printers. The rejected checks that find their way to pocket 28 can be investigated at a very early stage.

As seen, the authenticator filter 60 and the scanner 38 are at the same location along the processing path. The source of ultraviolet light 52 is directed toward the coating 54 on check 56. This causes an emission 58, a path of which is directed toward notch filter 60. If the frequency of the emission is, for instance, 579 nanometers, then a notch filter is used which will only pass frequencies of 575–584 nanometers. The emission will be blocked for all other frequencies and scanner 38 will not receive the emissions. However, the system will know, by a micro-switch or the like that a check or other document is present. This again, will trigger a diversion of that check to reject pocket 28.

The embodiment disclosed is the invention as presently contemplated. However, the reader should understand that various changes and modifications can be made without departing from the spirit of the present invention as described in the claims.

I claim:

1. A method for processing a document having printed indicia on at least one field area on one side thereof to receive indicia within said field area and for detecting a fraudulent document comprising the steps of:

applying a coating to said field area having an emission spectrum path of a particular frequency when subjected to a particular energy source;

highlighting indicia received on top of said coating by directing said energy source at said field area;

rejecting all documents not having said particular frequency;

reading the indicia highlighted by the coating of all non-rejected documents;

reading a code associated with said field area to determine the indicia within said field area;

developing digital information signals representative of only the indicia highlighted by the coating; and storing the digital information signals representative of the indicia within said field area.

2. A method for processing a document as defined in claim 1 wherein:

said step of applying a source of energy comprising bathing the document with ultraviolet light.

3. A method for processing a document as defined in claim 1 wherein:

said step of reading the indicia comprises reading indicia highlighted by fluorescence of said coating.

4. A method for processing a document as defined in claim 1 wherein:

said step of reading the indicia comprises reading indicia highlighted by phosphorescence of said coating.

5. A method for processing a series of negotiable instruments each having at least one field area on one side thereof that is coated by a fluorescent to receive visible indicia by a payor of the negotiable instrument fluorescent ink applied as a background field on the negotioable instrument and within said at least one field area, said ink having a known emission frequency spectrum when subjected to ultraviolet light and selectively rejecting all instruments that do not have a coating of said ink, said method comprising steps of:

applying an ultraviolet source of light to said negotiable instrument;

scanning said negotiable instrument to locate said background field;

reading only the visible indicia highlighted by the fluorescence of said fluorescent ink;

detecting all instruments which do not have said frequency spectrum;

developing digital information signals representative of only the visible indicia highlighted by the fluorescence of said fluorescent ink on the non-rejected instruments; and storing the digital information signals representative of the visible indicia within said field area.

6. A method for processing a series of negotiable instruments as defined in claim 5 and further comprising the step of:

preparing a statement of account including a reproduction of the indicia within said at least one field area of the negotiable instrument.

7. A system for detecting a fraudulent document from an authorized document wherein said authorized document has a fluorescent ink coating on an area thereof, and said ink has a known frequency emission spectrum when exposed to ultraviolet light, said system comprising:

an ultraviolet light source directed at said coating for actuating an emission of a particular frequency spectrum along a path;

a detector for recognizing said particular frequency spectrum;

a notch filter disposed in said path of said emission between said coating and said detector for blocking emissions that are not in said particular frequency spectrum; and means for developing a signal when said detector does not recognize said particular frequency spectrum.

8. The system of claim 7 wherein said fluorescent ink coating has an emission spectrum of a defined frequency when exposed to ultraviolet light and said notch filter permitting a flow there through of emissions having a range of between five nanometers and minus five nanometers from said defined frequency.

9. The system of claim 8 wherein said defined frequency is 544 and said range is from 539–549 nanometers.

10. A document system for automatic bank scanning processing and fraud detection a document wherein said document has a field area, a coating of fluorescent ink on said area that is inactive under normal lighting conditions and operable for receiving visible indicia placed within said area and said fluorescent ink and further operable for selectively permitting a scanner to read indicia place upon said coating, said system comprising:

a scanning apparatus for reading said indicia when ultraviolet light is directed at said coating;

said ultraviolet light for directing at said coating actuating an emission of a particular frequency spectrum along a path;

a detector for recognizing said emission;

a notch filter disposed in said path of said emission between said coating and said detector for blocking emissions that are not in said frequency spectrum; and means for developing a signal when said detector does not recognize said frequency spectrum.

11. The system of claim 10 wherein the frequency spectrum of said emission from said coating is 579 nanometers.

12. An automatic bank scanning and processing system in combination with a check comprising:

said check having a planar member of generally rectangular configuration and having a width and height and bank identification information and an area for receiving a date of making the negotiable instrument on one side thereof, said planar member further having a first field area on said one side for receiving indicia within said first field area designating a maker of the negotiable instrument, said planer member having a second field area on said one side for receiving indicia within said second area designating a payee of the negotiable instrument and said planar member having a third field area on said one side for receiving a numeric amount of said negotiable instrument; and fluorescent ink means having a known frequency emission when exposed to ultraviolet light applied as a background coating upon said negotiable instrument within at least one of said first, second, and third field areas, said fluorescent ink means being operable for receiving visible indicia placed within said at least one of said first, second, and third field areas and upon said fluorescent ink means background, said fluorescent ink means being further operable for selectively permitting a scanner to read the said at least one of said first, second, and third field areas of said check for optically rendering indicia placed upon said background coating, said system including a scanning apparatus for directing ultraviolet light onto said negotiable instrument wherein information located within said at least one of said first, second, and third field areas, regardless of location on the negotiable instrument, may be automatically detected and scanned;

an ultraviolet light source directed at said coating for actuating an emission of a particular frequency spectrum along a path;

a detector for recognizing said particular frequency spectrum;

a notch filter disposed in said path of said emission between said coating and said detector for blocking emissions that are not in said particular frequency spectrum; and means for developing a signal when said detector does not recognize said particular frequency spectrum.

* * * * *

US005456498B1

REEXAMINATION CERTIFICATE (3460th)

United States Patent [19]

Greene

[11] B1 5,456,498

[45] Certificate Issued Mar. 10, 1998

[54] NEGOTIABLE INSTRUMENT FRAUD DETECTOR AND PROCESSOR

[75] Inventor: Edwin B. Greene, 60K Crescent Rd., Greenbelt, Md. 20770

[73] Assignee: Edwin B. Greene, Greenbelt, Md.

Reexamination Request:
No. 90/004,315, Jul. 26, 1996

Reexamination Certificate for:
Patent No.: 5,456,498
Issued: Oct. 10, 1995
Appl. No.: 169,207
Filed: Dec. 20, 1993

[51] Int. Cl.[6] .................................................. B42D 15/00
[52] U.S. Cl. ................................. 283/70; 283/92; 235/468
[58] Field of Search ......................... 283/58, 67, 70, 283/85, 92, 901, 74, 89; 235/468

[56] References Cited

U.S. PATENT DOCUMENTS

| | | | |
|---|---|---|---|
| 3,088,841 | 5/1963 | Guertin | 117/1 |
| 3,108,694 | 10/1963 | Crain et al. | 209/111.5 |
| 3,282,210 | 11/1966 | Weig | 101/426 |
| 3,614,430 | 10/1971 | Berler | 250/71 R |
| 3,763,356 | 10/1973 | Berler | 235/61.12 N |
| 3,786,237 | 1/1974 | Postal | 235/61.11 E |
| 3,818,191 | 6/1974 | Fennema et al. | 235/61.11 E |
| 3,886,083 | 5/1975 | Laxer | 252/301.2 R |
| 4,146,792 | 3/1979 | Stenzel et al. | 250/365 |
| 4,160,902 | 7/1979 | van Wijngaarden | 250/461 R |
| 4,275,299 | 6/1981 | Favre | 250/271 |
| 4,277,774 | 7/1981 | Fujii et al. | 340/146.3 Q |
| 4,451,521 | 5/1984 | Kaule et al. | 428/199 |
| 4,485,308 | 11/1984 | Rabatin | 250/461.1 |
| 4,500,116 | 2/1985 | Ferro et al. | 283/92 |
| 4,544,183 | 10/1985 | Parkinson | 283/85 |
| 4,558,224 | 12/1985 | Gober | 250/461.1 |
| 4,642,526 | 2/1987 | Hopkins | 315/244 |
| 4,874,188 | 10/1989 | Gravisse et al. | 283/89 |
| 5,005,873 | 4/1991 | West | 283/92 |
| 5,030,833 | 7/1991 | Nozaka et al. | 250/461.1 |
| 5,048,109 | 9/1991 | Bloomberg et al. | 382/50 |
| 5,120,088 | 6/1992 | Radcliffe et al. | 283/67 |
| 5,169,155 | 12/1992 | Soules et al. | 273/293 |
| 5,209,513 | 5/1993 | Batelli et al. | 283/67 |
| 5,259,907 | 11/1993 | Soules et al. | 156/277 |
| 5,262,650 | 11/1993 | Chadwick | 250/461.1 |
| 5,264,700 | 11/1993 | Tommasini et al. | 250/372 |
| 5,418,855 | 5/1995 | Liang et al. | 380/23 |

FOREIGN PATENT DOCUMENTS

| | | |
|---|---|---|
| 8403616 | 10/1984 | South Africa . |
| 1186253 | 4/1970 | United Kingdom . |

OTHER PUBLICATIONS

P. Pringsheim "Fluorescence and Phosphorescence" Interscience Publishers, Inc. (New York, 1949), pp. 3–5 and 290–293.

K. Y. Wong et al. "Document Analysis System" IBM J. Research and Development, vol. 26 No. 6 (Nov. 1982) pp. 647–656.

K. Ono "Using Colors as a Visual Cue to the Structure of Documents" IBM Technical Disclosure Bulletin, vol. 33, No. 2 (Jul. 1990) pp. 450–453.

P. L. Trotti, Ed. "The Photonics Dictionary™", 37th International Edition (Laurin Publishing Company, Inc. Pittsfield, MA, 1991) pp. D–11, D–49, D–89, and D–98.

*Primary Examiner*—Willmon Fridie, Jr.

[57] ABSTRACT

A device for detecting fraudulent negotiable instruments by coating areas of the negotiable instruments with a fluorescent substance that, when subjected to an ultraviolet light source, develops an emission of a certain known frequency. The device includes a filter which only passes known emission frequencies so that negotiable instruments can be rejected that do not exhibit that frequency.

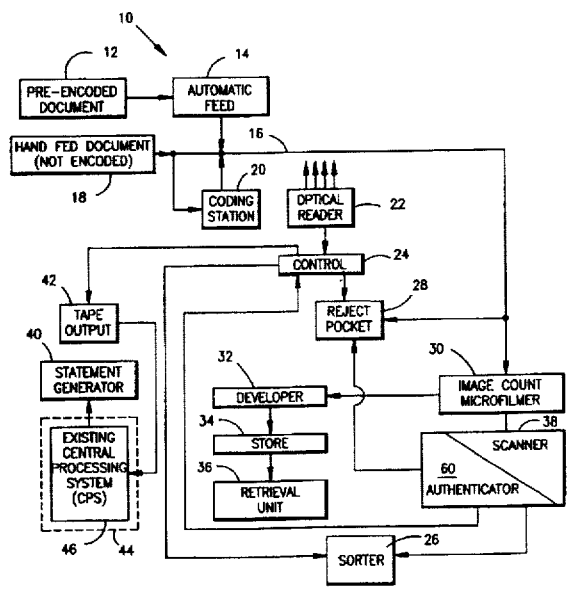

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 are cancelled.

* * * * *